United States Patent [19]
Xu et al.

[11] Patent Number: 6,089,646
[45] Date of Patent: Jul. 18, 2000

[54] VEHICULAR WINDOW ASSEMBLY

[75] Inventors: Qihua Xu, Holland; David E. Nestell, Spring Lake, both of Mich.

[73] Assignee: Donnelly Corporation, Holland, Mich.

[21] Appl. No.: 09/005,487

[22] Filed: Jan. 12, 1998

[51] Int. Cl.[7] .................................. B60J 1/10; E06B 3/54
[52] U.S. Cl. ................. 296/146.15; 296/93; 52/204.591
[58] Field of Search ................. 296/146.15, 93, 296/201, 96.21; 52/204.5, 204.62, 204.7, 204.591

[56] References Cited

U.S. PATENT DOCUMENTS

| | | | |
|---|---|---|---|
| 3,945,975 | 3/1976 | Strack | 260/33.6 |
| 4,001,154 | 1/1977 | Schmidt | 260/29.4 |
| 4,072,340 | 2/1978 | Morgan | 296/84 |
| 4,139,234 | 2/1979 | Morgan | 296/84 |
| 4,700,525 | 10/1987 | Nieboer et al. | 52/698 |
| 4,858,988 | 8/1989 | Morgan et al. | 296/201 |
| 5,261,721 | 11/1993 | Conger et al. | 296/146.15 |
| 5,331,784 | 7/1994 | Agrawal et al. | 52/393 |
| 5,443,673 | 8/1995 | Fisher et al. | 156/245 |
| 5,475,956 | 12/1995 | Agrawal et al | 52/208 |
| 5,544,458 | 8/1996 | Fisher et al. | 52/204.591 |
| 5,635,281 | 6/1997 | Agrawal | 428/192 |

FOREIGN PATENT DOCUMENTS

| | | |
|---|---|---|
| 748683 | 12/1996 | European Pat. Off. . |
| 892209 | 1/1999 | European Pat. Off. . |
| 2757805 | 7/1998 | France . |

OTHER PUBLICATIONS

U.S. application No. 08/895,956, filed Jul. 17, 1997, entitled Vehicular Component Assembly With Hard Coated Element.
U.S. application No. 08/905,175, filed Aug. 4, 1997, entitled Vehicle Component Assembly With Improved Primer For Reaction Injection Molding, and Method For Making and Using Same.
U.S. application No. 08/528,751, filed Sep. 15, 1995, entitled Gasketed Panel.

*Primary Examiner*—Joseph D. Pape
*Attorney, Agent, or Firm*—Van Dyke, Gardner, Linn & Burkhart, LLP

[57] ABSTRACT

A vehicular window assembly adapted to close an opening in a vehicle body includes a window panel of glass or plastic in the form of a sheet, a primer layer, and at least one polymeric gasket preferably molded to the panel on the primer layer from an olefinic-styrenic copolymer such as an ethylene-styrene copolymer or ethylene-styrene interpolymer. The primer preferably has a transition temperature above which improved adhesion characteristics are exhibited, and the panel and primer are preferably preheated above the transition temperature prior to molding or other application of the gasket. Alternately, the primer can be cross-linkable and is preferably cured after application of the gasket through ambient moisture and/or post heating. The gasket may also be preformed and applied to the window panel with pressure and heat.

32 Claims, 6 Drawing Sheets

VEHICULAR WINDOW ASSEMBLY

BACKGROUND OF THE INVENTION

This invention relates to panel assemblies, and more particularly, to window panel assemblies having a gasket mounted on one or more sides of a sheet of glass or plastic and used as a panel or window in a vehicle, building or other structure, as well as a method for making such window assemblies. Such window assemblies are commonly known in the vehicle industry as "modular windows."

Modern modular vehicle windows include a gasket attached by molding or extrusion directly onto the glass panel. In manufacturing molded, modular window panels, a sheet of glass is closed within a molding tool, and a polymeric material is injected around the peripheral edge on opposing surfaces or on a single surface of the sheet edge, thereby attaching the polymeric material to the peripheral edge of the glass panel. After the material is cured, the mold is opened and the panel assembly is removed. To retain the modular window assembly within the vehicle, studs or clips may be molded within or attached to the gasket and panel and used to engage the pinch weld flange forming the vehicle opening. Alternately, or in addition thereto, a bead of adhesive can be applied to bond the panel assembly directly to the pinch weld flange.

One category of modular windows includes assemblies having an exposed peripheral edge on the glass panel known as "flush-mounted" window assemblies. One such flush-mounted vehicle includes an extruded gasket of thermosetting material deposited directly on the surface of a glass sheet. In other assemblies, the extrusion includes two adhesive beads of polyurethane compounds, one deposited by the panel assembly manufacturer and the other applied by the vehicle assembler. Such assemblies require a long cure time for the first bead, adding cycle time to manufacturing. In addition, the gasket material used in the forming the extruded gasket is typically not ultraviolet radiation stabilized by itself and can degrade over time upon exposure to the elements. Moreover, the extrusion process does not easily adapt itself to receiving mounting studs or clips, or to forming in variable cross sections. Extrusion is also expensive, and requires special storage and handling after manufacture.

Other window assemblies intended for use in flush-mounted applications include a gasket of thermosetting material molded directly to a single surface of panel in a molding machine using reaction injection molded (RIM) urethane. Although variable cross sections can be formed using this method, RIM urethane gaskets still degrade when subjected to prolonged exposure to UV light, require a long cycle time during manufacture, and have increased material costs compared with other materials. In addition, it is often found that the tension or shear force applied to the glass and RIM molded gasket results in failure of the adhesive seal between the gasket and the glass panel.

Additionally, gaskets formed with materials including urethane, RIM urethane, PVC and the like, often require the use of additional seals or sealants between the modular window assembly and the pinch weld flange of the vehicle in order to effectively exclude water, dirt, dust and the like from entering the vehicle. However, the use of such additional seals adds complexity, labor and expense to the vehicle assembly process.

Accordingly, a need exists in the vehicle industry for a modular vehicle window assembly which incorporates a gasket material suitable for formation of gaskets on one, two or three sides of the sheet window panel, for incorporation of fasteners which allow attachment of the assembly mechanically to the vehicle, and for elimination of the need for additional seals. In addition, the gasket material desirably should allow for a reduction in costs, and provide a reliable, high-strength bond between the window panel surface and gasket for long-term security in attachment of windows to the vehicles and wherein the gasket materials exhibit low to moderate compression set, good flexibility and resiliency, good low temperature operating characteristics, and good creep resistance.

SUMMARY OF THE INVENTION

Accordingly, the present invention provides a vehicular window assembly having a gasket bonded to one or more surfaces of a window panel wherein the gasket is formed from a polymeric material which can be attached to the window panel with a high strength bond, allows the incorporation of fasteners for mechanical securement of the window assembly to the vehicle without failure due to material creep, and has a consistency and resiliency sufficient to avoid the need for additional seals apart from the gasket itself. Preferably, the gasket is molded from a thermoplastic elastomer such a thermoplastic olefin. More preferably, the gasket is molded from an olefinic-styrenic copolymer. Most preferably, the gasket is molded from an ethylene-styrene copolymer, one example of which is ethylene-styrene interpolymer (ESI) formed from a melt-processible, low halogen or halogen free polymer resin material, such as a resin based on polyolefin and produced using a metallocene catalysis and having a durometer within the range of between about 30 and 110 on the Shore A scale, more preferably 65 to 95 Shore A, and most preferably 65 to 85 Shore A.

In one form, the vehicle window assembly of this invention includes a sheet-like panel having a pair of surfaces terminating in a peripheral edge. A primer layer is applied to a predetermined area of one panel surface. Applied to the panel on at a least a portion of the panel surface including the primer layer is a polymeric gasket. The gasket is formed from an olefinic-styrenic copolymer and is bonded to the primed panel portion.

In another form of the vehicle window assembly, the gasket may be molded to have a variable cross section around the same panel. Furthermore, the gasket may be molded about and partially encapsulate guiding or mounting hardware used to locate and/or fix the panel assembly in the vehicle window opening. In addition, the sheet glass or other window panel may include a layer of opaque, ceramic frit material on which the gasket is molded which conceals and hides the attachment area of the gasket when the window assembly is viewed from the exterior, such as when it is assembled in a vehicle.

Preferably, the primer layer has a transition temperature at or above which improved adhesion and bonding occurs. With this type of primer, the olefinic-styrenic copolymer such as the ethylene-styrene copolymer is molded on the glass panel while the panel and primer are at or above the transition temperature, which preferably is approximately 93° C. (200° F.) or greater.

Alternately, other primer materials can be used and achieve improved high temperature resistance. Such primers are cross-linkable primers consisting of functionalized polyolefins, thermoplastic elastomers (TPE's) including ethylene-styrene copolymer (inter-polymer), or urethanes, acrylics and epoxies which can be heat cured, ambient cured by cross linkers, or ambient moisture. Such a primer can be further activated by post heating the injection molded assembly with an external energy source, such as a controlled focus infrared (CFIR) source, a controlled area infrared (CAIR) source, or other heat sources.

According to yet another aspect of the invention, a vehicle window assembly is made according to the method of providing a panel having a primer coating having a known primer transition temperature applied to at least a portion of the panel surface. Subsequently, the panel and primer coating are heated to raise the temperature of the primer to at least the transition temperature of the primer. While maintaining the temperature of the panel and primer greater than the primer transition temperature, an olefinic-styrenic copolymer such as an ethylene-styrene copolymer gasket is molded onto the primer coating. The melt temperature of the polymeric material is preferably at a temperature at least equal to the transition temperature of the primer.

Alternately, a panel is coated with a cross-linkable primer on at least a portion of a panel surface, followed by molding a gasket from an olefinic-styrenic copolymer such as an ethylene-styrene copolymer onto the primer coating. Thereafter, the molded assembly is allowed to ambient cure with moisture, or is heat cured using external heat sources such as CFIR or CAIR sources as explained hereinafter.

The invention provides significant benefits over prior known modular window assemblies manufactured with gaskets formed from prior known materials. The gasket is adhered with a high-strength bond allowing use in flush-mounted panel applications with a gasket on only one surface of the window panel, or in applications requiring gaskets on two or three surfaces of the window panel. In addition, the durometer range and creep resistance of olefinic-styrenic copolymers such as ethylene-styrene copolymers may allow the elimination of additional seals beyond the molded gasket itself, and may allow the formation of various gasket shapes and sizes to accommodate many different vehicle configurations. Further, the olefinic-styrenic copolymers such as ethylene-styrene copolymers may receive and retain fasteners embedded within the gasket material for secure, long-term attachment of the window assemblies to the vehicles, and are melt-processible, low halogen or halogen free polymers which are easily recycled.

These and other objects, advantages, purposes and features of the invention will become more apparent from a study of the following description taken in conjunction with the drawings.

DESCRIPTION OF THE PREFERRED EMBODIMENTS

Referring now to the drawings in greater detail, FIGS. 1–5 illustrate one embodiment of a single-sided gasketed panel assembly 20 specifically adapted for closing a window opening 21 in a vehicle body, although it is contemplated that the same structure and method may be used for panel assemblies in buildings, ships and the like. Panel assembly 20 includes a panel or sheet 22; preferably of transparent glass which may be tempered, laminated, or otherwise strengthened using conventional techniques and principles. Sheet 22 has two substantially parallel sides, surfaces, or faces 24, 26 which terminate at a peripheral edge 28 of predetermined geometric shape. Although transparent glass is preferred, other sheet-like panel materials may be used such as opaque or coated glass, transparent coated or opaque plastic materials, or multi-composite laminates, such as transparent glass and plastic.

Optionally, and preferably, deposited on and bonded to surface 26 of panel 22 is an opaque, and preferably black frit layer, and most preferably a ceramic frit layer or coating 30 covering and concealing a region from peripheral edge 28 inward. Alternately, frit layer 30 may cover all or substantially all of surface 26. Usually, however, frit layer 30 conceals a peripheral area of surface 26 near edge 28, such as two or so inches in from edge 28. Glass panel 22, which is initially in an untempered condition after cutting and sizing to its desired shape, is painted by screen coating or other techniques, with a coating of dark ceramic paint on its rear surface 26. Thereafter, glass panel 22 is suitably heated and bent to the desired contour with a bending furnace or other bending apparatus, followed by tempering to strengthen the glass. Such heating, bending, and tempering operations cause the ceramic paint on surface 26 of the glass to become fused to the surface 26. Thus, although starting as a layer of paint containing ceramic particles and pigment, coating 30 ends up, after bending and tempering, as a thin frit layer of low melting point ceramic material which, in actuality, is fused to surface 26 of glass panel 22. Since ceramic frit coating 30 includes a pigment of a desired color, preferably a dark color such as black, dark blue, or the like, the layer results in a permanent, second surface coloration of the glass panel. When viewed from the front side, the transparent thickness of panel 22, backed up by the colored ceramic frit layer 30, provides an appearance of depth and richness which blends well with the surrounding painted or glass areas on a vehicle.

One ceramic paint used to form the opaque black ceramic frit coating 30, described above, is manufactured by Drakenfeld Color, Inc. of Washington, Pa. Such paint includes small ceramic particles and a suitable metal oxide pigment suspended in oil of a type conventionally known in the art. The preferred pigment in such paint is carbon black to cause the resulting frit layer to be opaque and black in color. This ceramic paint is preferably screen-coated on a predetermined portion of rear surface 26 of panel 22 using a 200 mesh screen. The resulting frit layer 30 has the ceramic particles melted and fused to one another, is permanently bonded and fused to the rear glass surface 26, and is the equivalent of the glass itself in terms of strength and adherence.

Fixed to ceramic frit layer 30, and extending along and around at least a portion of sheet 22 and spaced in from peripheral edge 28, is a flexible, resilient polymeric form or bead which defines a static spacer, gasket, or grommet 32 (hereinafter "gasket") intended to engage pinch weld flange 31 of the window opening when installed. It is preferred that polymeric gasket 32 be formed from a thermoplastic material such as a thermoplastic elastomer and more preferably, a thermoplastic olefin (TPO). More preferably, gasket 32 is formed from a thermoplastic olefinic-styrenic copolymer such as an ethylene-styrene (ES) copolymer as will be more fully explained below.

Figure 1:
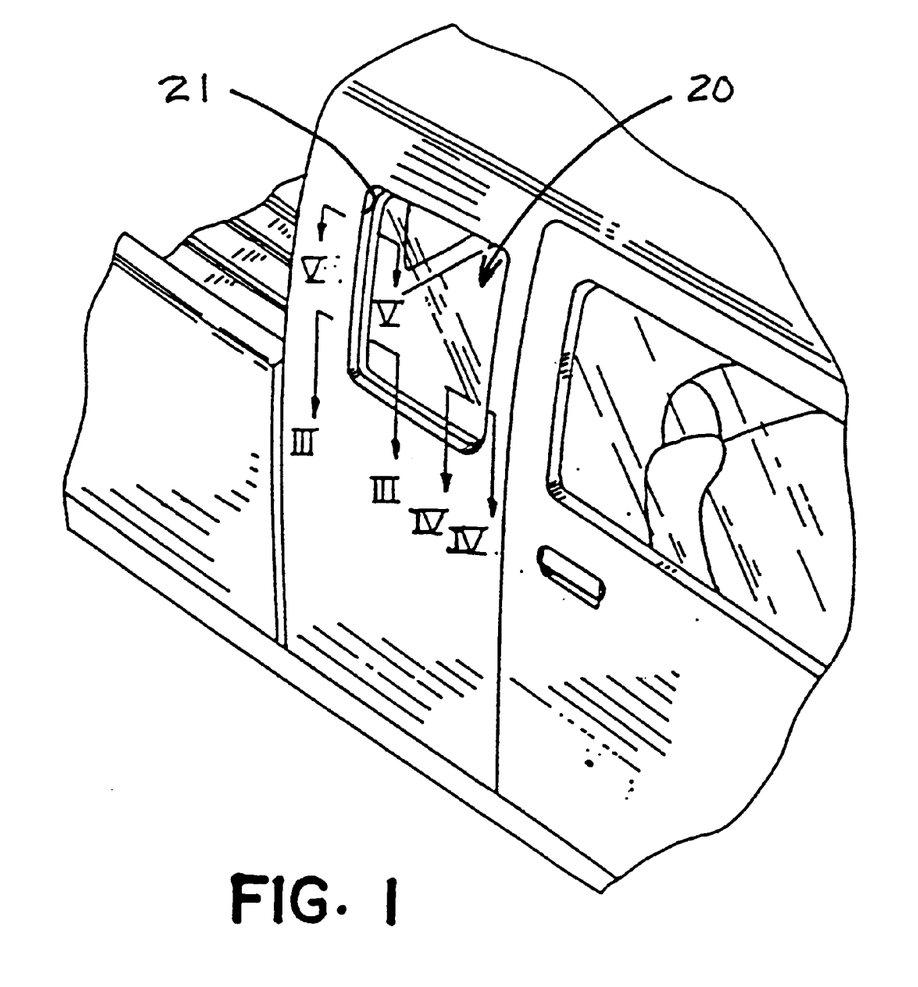
FIG. 1 is a fragmentary, perspective view of a vehicle containing one embodiment of the window of the present invention.
Figure 2:
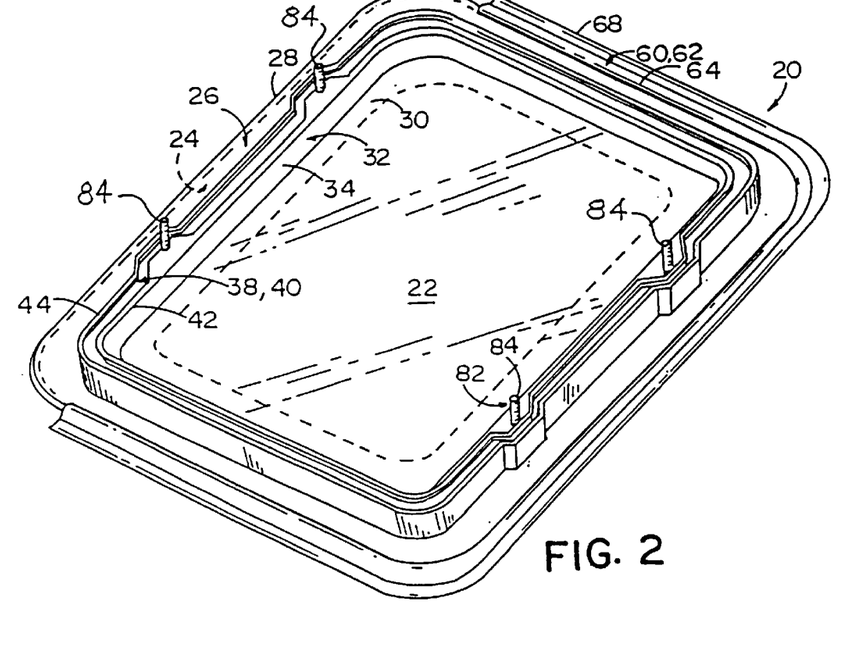
FIG. 2 is a perspective view of the interior side of the window assembly shown in FIG. 1 and removed from the vehicle opening.
Figure 3:
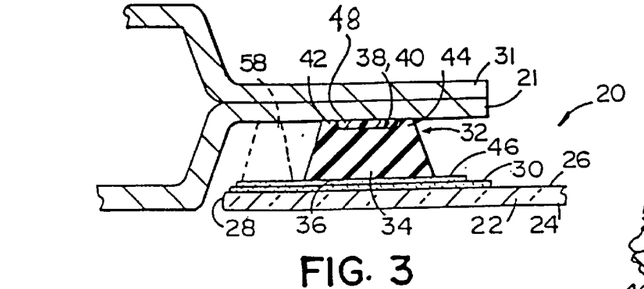
FIGS. 3–5 are fragmentary, sectional views of several embodiments of the window assembly taken along lines III—III, IV—IV and V—V of FIG. 1.

In one embodiment shown best in FIGS. 2 and 3, gasket 32 includes a body 34 of generally trapezoidal cross section having a first surface 36 in intimate contact with, and bonded to, ceramic frit layer 30. An opposite surface 38 includes a generally rectangular channel 40 which may extend along the entire length of spacer or gasket 32. Channel 40, in turn, defines first and second flanges 42, 44, respectively, which run adjacent channel 40. Although it is preferred that gasket 32 have a width less than or equal to 0.75 inch and a thickness less than or equal to 1.0 inch, the thickness and width of gasket body 34 and flanges 42, 44 may vary depending upon the application of window panel assembly 20. One portion of gasket 32 may have a profile upwards of 1.0 inch thick, while another portion may have a thinner, low profile at another location on panel 22. The width dimension may also vary as shown in FIG. 2 such as the wider areas where guides/fasteners 84 are located. As will become more apparent, panel 22 may also have a spacer or gasket with more than one cross-sectional profile, or might have separate portions of the same or differing size, thickness, width and/or profile.

Although gasket 32 may be made using a variety of techniques, including liquid, slurry and compression molding, the preferred technique is injection molding using the preferred olefinic-styrenic copolymer such as an ethylene-styrene (ES) copolymer material. An example of a preferred ethylene-styrene copolymer is a melt-processible low-halogen or halogen-free polymer resin material, such as resins based on polyolefins and produced using metallocene catalysis. Specifically, ethylene-styrene interpolymers (ESI) are used which are available from Dow Chemical, Freeport, Tex., and which, preferably, utilize Dow's INSITE™ single-catalyst technology wherein, depending on the amount of styrene incorporated, the solid state of the polymer can exhibit a variety of structures and durometer hardnesses, including semicrystalline and amorphous rubber. Alternately, polyolefin based resins available from TOSOH Company of Tokyo, Japan and formed using TOSOH's CATALLOCENE™ metallocene catalyst technology can be used to form gasket 32. Preferably, the olefinic-styrenic copolymer such as ethylene styrene copolymer, and more preferably the ESI copolymer formed using INSITE™ single catalyst technology, has a Shore A durometer hardness of between about 30 and 110 Shore A, more preferably 65 to 95 Shore A, and most preferably 65 to 85 Shore A, and a specific gravity of approximately 0.8 to 0.95 grams per cubic centimeter.

The structure of ethylene-styrene copolymer is as follows:

where x can range from 1 to 500, or greater; y is typically 1 or greater, and n can range from 1 to 1000, or greater.

Ethylene-styrene copolymers or interpolymers can be prepared by conventional Ziegler-Natta catalysis or by a free radical copolymerization. The concentration of styrene unit so formed in the copolymer is limited to about <1% (molar percentage) due to the low reactivity of styrene under the given polymerization conditions. With such a low styrene content in the copolymer, the mechanical properties do not significantly differ from that of polyethylene.

Use of metallocene catalysis (as is conventionally known in the polymer arts) such as Dow Chemical's INSITE™ technology dramatically improves the reactivity of styrene in the ethylene-styrene copolymerization process. Ethylene-styrene copolymers made by such metallocene catalysts can have a styrene content of about 1% and up to about 50 molar %. In order to exhibit the performance properties desirable for use as a gasketing material for vehicular modular windows (such as described herein), it is desirable that the styrene content in the copolymer be in the range from about 5 to 35 molar percent so that the material exhibits good flexibility, even at low temperatures [such as 0° C. (32° F.) or below] and exhibits good heat resistance when exposed to elevated temperatures such as about 60° C. (140° F.) or higher. At low concentration of styrene, the copolymer exhibits properties similar to that of polyethylene which is a tough, semi-rigid thermoplastic. With the increase of styrene content, the copolymer changes from crystalline to semicrystalline. Moreover, with increasing styrene content, the melting point and crystallinity of the copolymer decreases and the flexural modulus decreases. For example, with increased styrene content such as 5 molar % or above, a flexural modulus of about 200 megapascals or lower at a temperature of about 0° C. (32° F.), more preferably about 100 megapascals or lower at 0° C. (32° F.), and most preferably about 50 megapascals or lower at 0° C. (32° F.) can be achieved for the ethylene-styrene copolymer. With an increase in styrene content, the upper limit of the temperature range at which the copolymer material can be used also decreases, and thus a balance is found between flexibility and heat resistance by customizing the styrene content for the particular application. At higher styrene content (such as about 5 molar % or above), a molding formed of the copolymer becomes flexible, rubbery and performs more like a thermoplastic elastomer (TPE). With even higher concentration of styrene in the copolymer (about >30 molar % or higher), the crystallization decreases and an amorphous phase dominates. The copolymer at high styrene concentration (about >35 molar %) becomes glassy because the glass transition temperature of the copolymer increases to above room temperature. The copolymer with overly high styrene content can start to lose its flexibility and memory. For the copolymer to be useful as an encapsulation or molding material in window assemblies such as those described herein, it is desirable for the copolymer to have a melting temperature of at least about 60° C. (140° F.), more preferably, at least about 80° C. (176° F.) and, most preferably, at least about 100° C. (212° F.) to maintain adequate performance at the high end of the service temperature, sufficient amorphous content to achieve desired flexibility, and a low glass transition temperature [with the glass transition temperature preferably lower than about 10° C. (50° F.), and more preferably lower than 0° C. (32° F.), and most preferably lower than −10° C. (15° F.)] in order to offer flexibility and memory or sealing property. The higher temperature resistance of the ESI material can be improved by branching, by slightly cross-linking the copolymer, or by blending with other materials while still maintaining flexibility and memory.

A further method of making ethylene-styrene copolymers is by using a two-step process. The first step is to make styrene-butadiene copolymer:

The second step is to hydrogenate the styrene-butadiene copolymer. The resulting copolymer becomes hydrogenated styrene-butadiene copolymer or ethylene-styrene copolymer:

This method is capable of making ethylene-styrene copolymer with any styrene concentration including a styrene concentration about >50 molar %.

Ethylene-styrene copolymer may also include versions where either or both ethylene and styrene moeities can be substituted. Typical examples include ethylene- -methyl-styrene copolymer, ethylene butylene-styrene copolymer, and propylene-styrene copolymer. Optionally, and desirably, where enhanced adhesion to surfaces is desired, the phenyl ring of the styrene moeities and/or the ethylene moeities can incorporate functional groups including polar groups such as hydroxyls, carboxyls, amino groups, acrylate/acrylic groups, functionalized alkyl groups, epoxy groups, vinyl groups, allyl groups and their like.

Bonding gasket 32 to ceramic frit layer 30 is an adhesive primer layer 46. Primer 46 can be a transition temperature primer layer which is heated to a transition temperature prior to injection molding of gasket 32, which transition temperature is that at which the primer material shows marked improvement in bonding of the gasket to the window panel. Alternatively, a cross-linkable primer 46 can be used which is activated/cured by ambient cross linkers, or moisture, or the addition of heat after molding of the gasket 32 thereon, hereinafter referred to as "post heating."

In the event the primer 46 which is used has a primer transition temperature, the primer may comprise a thermoplastic olefinic polymer including copolymers, homopolymers, functionalized copolymers and functionalized homopolymers such as ethylene-styrene interpolymers, ethylene-vinyl acetate copolymers, ethylene-acrylic acid copolymers, ethylene-vinyl silane copolymers, ethylene vinyl alcohol copolymers, ethylene-acrylate copolymers, ethylene-vinyl silane-vinyl acetate terpolymers, ethylene-acrylate-acrylic acid copolymer, ethylene-acrylate-glycidyl methacrylate copolymers, silane grafted polyolefins, maleic anhydride grafted polyolefins, oxidized polyolefins, and chlorinated polyolefins, and polyolefins with any functional groups such as carboxylic acid, silane, hydroxy, anhydride, epoxy and halogen, and which are dissolved in a suitable solvent, or obtained in solution or water dispersion form. A preferred transition temperature primer, comprising a halogenated polyolefin, is that sold as Chemlok 487 by Lord Corporation of Erie, Pa. Primer 46 is applied as a liquid onto surface 26 of glass window panel 22, or onto the surface of frit layer 30, and dried at ambient conditions. Thereafter, the glass panel and primer together may be heated to a temperature above the primer transition temperature which, for the above mentioned polymers, is usually at least about 93° C. (200° F.). At such temperature, the primer layer becomes rubbery and tacky. The olefinic-styrenic copolymer such as ethylene-styrene copolymer, or more specifically, ethylene-styrene interpolymer (ESI), is then injection molded over the primed area while the primer and glass panel are at or above the primer transition temperature, following which the assembly is allowed to cool to a temperature below the primer transition temperature. High strength adhesion is achieved during the cooling phase to a temperature below the primer transition temperature. The characteristics and methods for determining the primer transition temperature are described more fully in U.S. Pat. No. 5,544,458, assigned to the assignee of the present invention, the disclosure of which is hereby incorporated by reference herein.

Alternately, primer 46 can be a cross-linkable primer, and preferably a cross-linkable primer which achieves improved high temperature resistance for the window assembly after manufacture. This group of primers consists of functionalized polyolefins, thermoplastic elastomers (TPE's) including ethylene-styrene copolymer (interpolymer), acrylics, or urethanes and epoxies. They can be heat cured, radiation cured [such as by ultraviolet radiation], ambient cured by cross-linkers, or cured by ambient moisture. After the primer is applied on surface 26 or frit layer 30 in liquid form and dried, the primer will start to cure before, during and after the injection molding of the ethylene-styrene copolymer or ESI material. Improved adhesion can be achieved by preheating the primed panel, or post heating the injection molded product typically in a manner as described below, such as by using a CFIR, or a CAIR, or another external heat source, which are more fully described below in conjunction with FIGS. 12 and 13. The adhesion is essentially achieved upon cooling and further improved by a complete cure of the primer layer. A specific example of a preferred cross-linkage primer compound found useful in the present invention is Donnelly Corporation DX95 which consists of 5–95% AT930, an ethylene-vinyl silane copolymer, from AT Plastics Inc. of Ontario, Canada, 0–80% DER331, a bisphenyl-A based epoxy, from Dow Chemical of Midland, Mich., 0–80% poly (ethylene-co-methyl acrylate-co-acrylic acid) and 0–80% poly (ethylene-co-methyl acrylate-co-glycidyl methacrylate) from Aldrich Chemical Company, Inc., 0–10% Z-6040 (3-glycidoxy-propyltrimethoxy silane) from Dow Corning of Midland, Mich.

The adhesion produced by primer layer 46, regardless of whether it is a transition temperature primer or a cross-linkable primer, can be improved by the use of a silane compound wiped on the surface 26 or frit layer 30 as an adhesion promoter prior to application of the primer layer. Such silane wipe improves adhesion at normal operating, ambient conditions of the ultimate vehicle, as well as under water soak or high humidity conditions. The silane wipe is performed on the clean surface 26 or frit layer 30 and dried. Primer layer 46 is then applied over the silane wipe. The remainder of the process is as described above in connection with either the transition temperature primer or crosslinkable primer.

In one embodiment, a butyl seal 48 is located on gasket 32 after molding so as to form a seal between gasket 32 and pinch weld flange 31. It is preferred to locate seal 48 along surface 38 and most preferably in channel 40 such as shown in FIG. 3. When used in combination with fasteners 84, gasket 32 compresses seal 48 against pinch weld flange 31 to form a substantially weather tight seal. One example of a suitable butyl tape or seal is available from Preform Sealant, Inc. of Warrenville, Ohio, and is designated 5.5 mm air core. In the alternative, and preferably when panel assembly 20 is not mechanically assisted to remain in the vehicle opening, a urethane adhesive 58 is used. See FIGS. 3–5. One example of a suitable urethane adhesive is BETASEAL brand adhesive available from Essex Chemical Corp. of Sayerville, N.J. which is a urethane material. Adhesive 58 is selected for its ability to bond glass or ceramic to metal and retain panel assembly 20 within the vehicle opening. Optionally, an adhesive bead may be deposited along surface 38 in channel 40 to bond panel assembly 20 to pinch flange 31. In such embodiment, the spacing of gasket 32 inwardly from edge 28, i.e., the encroachment of gasket 32 and frit layer 30 inwardly from peripheral edge 28, is minimized.

Figure 4:
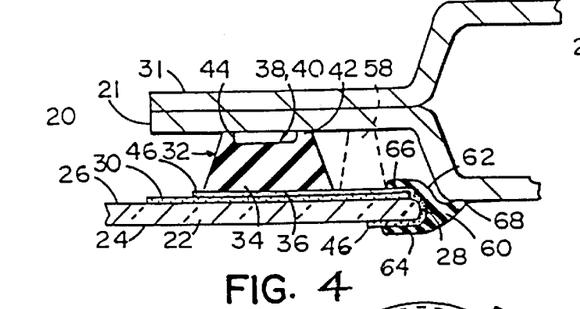

In another embodiment, shown in FIG. 4, in addition to gasket 32 described above, panel assembly 20 may include a second gasket 60 adapted to engage the panel opening or exterior of the vehicle. Gasket 60 is preferably adhered to three sides of the window panel 22 including frit layer 30, edge 28 and outer surface 24, each of which preferably includes one of the primer layers 46 as shown in FIG. 4. Alternately, gasket 60 could be adhered to two surfaces such as frit layer 30 and edge 28, or frit layer 30 and surface 24, or edge 28 and surface 24. In FIG. 4, gasket 60 is preferably molded from ethylene-styrene material onto and bonded to panel 22 about at least a portion of the peripheral edge and a portion of frit layer 30. In those applications where it is desirable to close the gap between panel peripheral edge 28 and the vehicle window opening, gasket 60 is formed so that it substantially encloses or encapsulates peripheral edge 28. Typically, gasket 60 is also applied over the same adhesion promoting primer coating as applied to the areas of panel 22 over which single-sided gasket 32 is molded.

Gasket 60 includes a body portion 62 from which a pair of securing flanges 64, 66 extend inwardly a predetermined distance over opposing panel surfaces 24, 26, respectively. A lip portion 68 extends from body 62 in a direction generally opposite to securing flanges 64, 66 to engage the vehicle panel opening or body. Optionally, a bead of BETASEAL or other adhesive may be deposited on frit layer 30 between spacer 32 and seal 60 or in channel 40, as described above, although the resiliency and durability of the olefinic-styrenic copolymer such as ethylene-styrene copolymer material is typically sufficient to eliminate the need for such additional sealant. When mechanical fasteners are used, a butyl tape may optionally be used in channel 38 as described above. Together with any locating or mounting hardware, described below, tape 48 seals window panel assembly 20 in the vehicle window opening.

Figure 5:
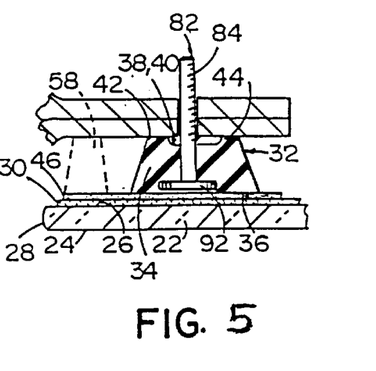

Yet another form of the inventive panel assembly 20 uses mechanical locators or mounting hardware to position, guide, and fix panel assembly 20 within window opening 21. One embodiment, shown in FIG. 5, includes a locating and mounting stud 82 having a shaft portion 84 terminating at one end in a head portion 92. Head portion 92 and a portion of shaft 84 are encapsulated within gasket 32 such that the remaining portion of shaft 84 extends out from gasket 32 and in a direction away from panel 22. It is preferred that shaft 84 extend from surface 38 in a direction substantially perpendicular to panel 22. Channel 40, in a preferred embodiment, becomes substantially narrowed and located to the outboard side of gasket 32 as it extends around the location of stud 82 (see FIG. 2). If desired, a fastener may be attached to stud 82 on the opposite side of pinch weld flange 31, to pull gasket 32 tightly against pinch flange 31 and retain panel assembly 20 in place. As in the previous embodiments, a bead of adhesive 58 may optionally be located either outboard or on gasket 32 to help retain and seal the panel assembly within window opening 31. Alternatively, butyl tape 59 may optionally be deposited in channel 40, either adjacent or around stud shaft 84, to form a water resistant seal with pinch weld flange 31. Advantages offered by the location of the locating or mounting hardware, such as shown in FIG. 5, include the ability to securely fasten panel 22 within opening 21 without encroaching into the viewing area or increasing the panel size.

The preferred olefinic-styrenic copolymer such as ES or ESI polymer material used to form gasket 32 is highly desirable because it exhibits excellent creep resistance, can be varied as desired for its durometer hardness, and can be formed with a variety of weather seals as described below. This material holds fasteners such as 84 well over the long-term life of the window assembly and vehicle under conditions of force applied through the fasteners to the gasket, as well as under high temperature conditions of between about 71° C. and 83° C. (160° F. and 180° F.) to which vehicles are often subjected.

Figure 6:
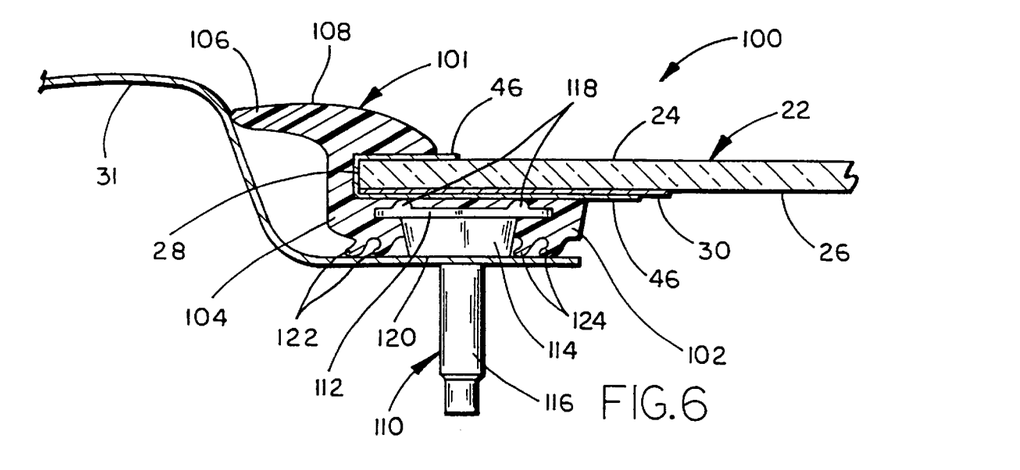
FIGS. 6–8 are fragmentary, sectional views of alternate embodiments of the window assembly taken along sections lines similar to those shown in FIG. 1.

FIGS. 6–11 illustrate alternate embodiments of the modular window assembly of the present invention including molded gaskets formed on one or more sides of the window panel. In FIG. 6, window assembly 100 has a modified gasket 101 bonded to glass window panel 22 over frit layer 30 and one of the primer layers 46 described above. Gasket 101 extends around the three sides 24, 26, 28 of the glass panel. In this case, primer layer 46 extends around such three sides to provide a secure bond of the gasket 101 in all areas to glass panel 22. Gasket 101 includes an inner side body 102 formed as an elongated strip extending along and around the periphery of the glass panel, which body integrally joins a peripheral portion 104 adjacent glass edge 28, which, in turn, integrally joins a curved lip 106 which extends outwardly away from panel end 28 into contact with pinch weld flange 31 to form a seal of the assembly against the pinch weld flange. Lip portion 106 has a curved surface 108 which extends from the glass panel to the pinch weld flange to form a finished, quality surface. Gasket 101 also includes a modified fastener 110 of metal or plastic including a square or rectangular base flange 112, a spacer body 114 formed or molded integrally with base flange 112 and a shaft 116 extending perpendicularly to base flange 112. On the side of flange 112 facing glass panel 22 are formed raised feet or ribs 118 which space the flange 112 from frit layer 30 and allow the flange to be completely surrounded by and embedded in the molded polymeric material forming body 102. The outer surface 120 of spacer body 114 is generally planar and engages the generally planar pinch weld flange around an opening through which shaft 116 projects. Extending along and on either side of fastener 110 are molded sealing lips 122, 124 which extend continuously along the outer side of body 102 for the full extent of the length of gasket 101. Sealing lips 122, 124 are flexible, resilient and adapted to flex to engage the outer surface of pinch weld flange 31 and form a weather seal preventing the entry of moisture, dirt, dust and the like to the interior of the vehicle. The extent to which the lips 122, 124 are compressed against pinch weld flange 31 is controlled by the thickness of spacer body 114 and the contact between surface 120 and the pinch weld flange.

Figure 7:
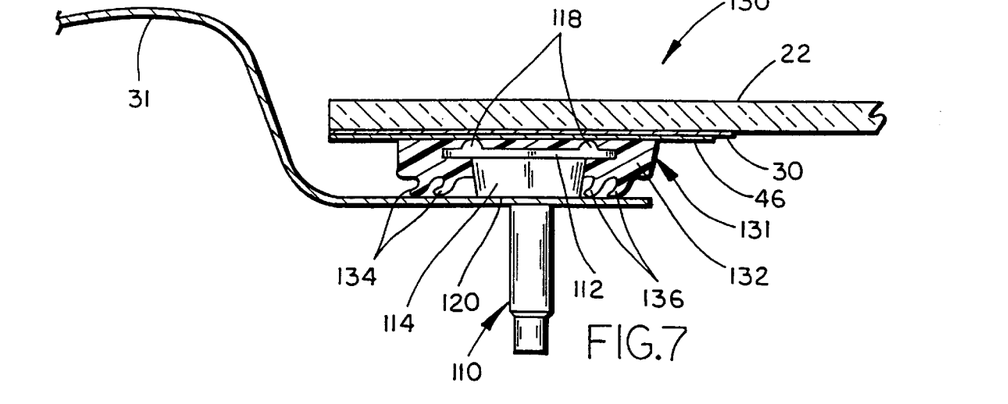

A modified gasket 131 is shown in the modular window assembly embodiment 130 of FIG. 7 and is a single-sided gasket having a body portion 132 similar in size and configuration to body portion 102 of gasket 101 in FIG. 6. Like gasket 101, gasket 131 includes fastener 110 embedded therein during the molding process such that feet 118 contact the glass panel or frit layer 30 while surface 120 of body 114 engages the pinch weld flange 31. When fastener 110 is secured in this manner, integrally molded sealing lips 134, 136 on either side of the fastener 110, which extend along the outer surface of body 132 of gasket 131 are compressed slightly to engage the outer surface of the pinch weld flange and provide a weather seal just as in FIG. 6. In this version, any additional sealing lip or seal is eliminated. Preferably, gasket 131 is formed from a thermoplastic olefinic material, preferably an olefinic-styrenic copolymer, specifically ethylene-styrene copolymer or ethylene-styrene interpolymer as described above. As with gasket 101, gasket 131 is preferably molded on primer layer 46 and frit layer 30.

Figure 8:
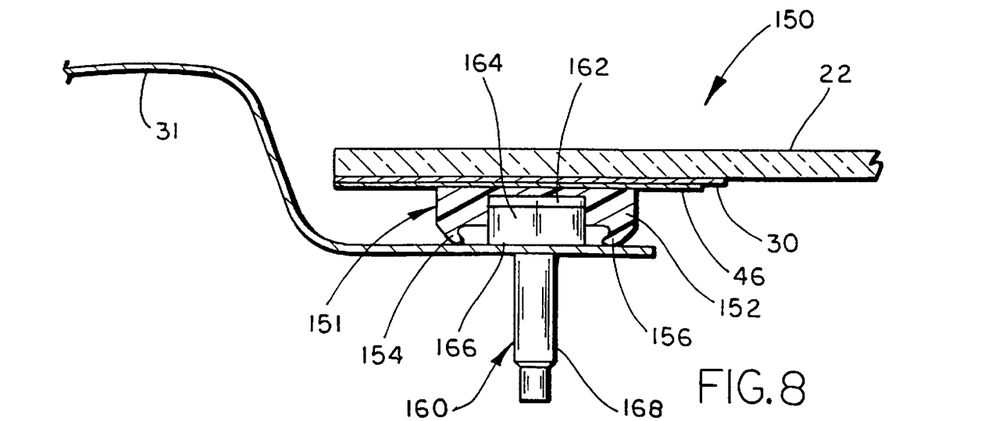

In FIG. 8, a further embodiment 150 of the modular window assembly includes a modified gasket 151 also formed from a thermoplastic olefin, preferably an olefinic-styrenic copolymer, more preferably ethylene-styrene copolymer or ethylene-styrene interpolymer. Gasket 151 includes an elongated body 152 extending along the periphery of the window panel 22 over primer 46 and frit layer 30 and includes inwardly extending molded lips 154, 156 on either side of a modified fastener 160. Fastener 160 includes a square or rectangular flange 162 spaced from frit layer 30 or glass panel 22 joined to body 164 which extends out of the molded body of gasket 151 such that its outer surface 166 engages pinch weld flange 31 to space the assembly from the flange and control the compression of molded sealing lips 154, 156. Body 164 is larger than an aperture through pinch weld flange 31 which receives shaft 168 extending perpendicular to flange 162 and glass panel 22 for receiving a fastener to secure the assembly in the vehicle.

Figure 9:
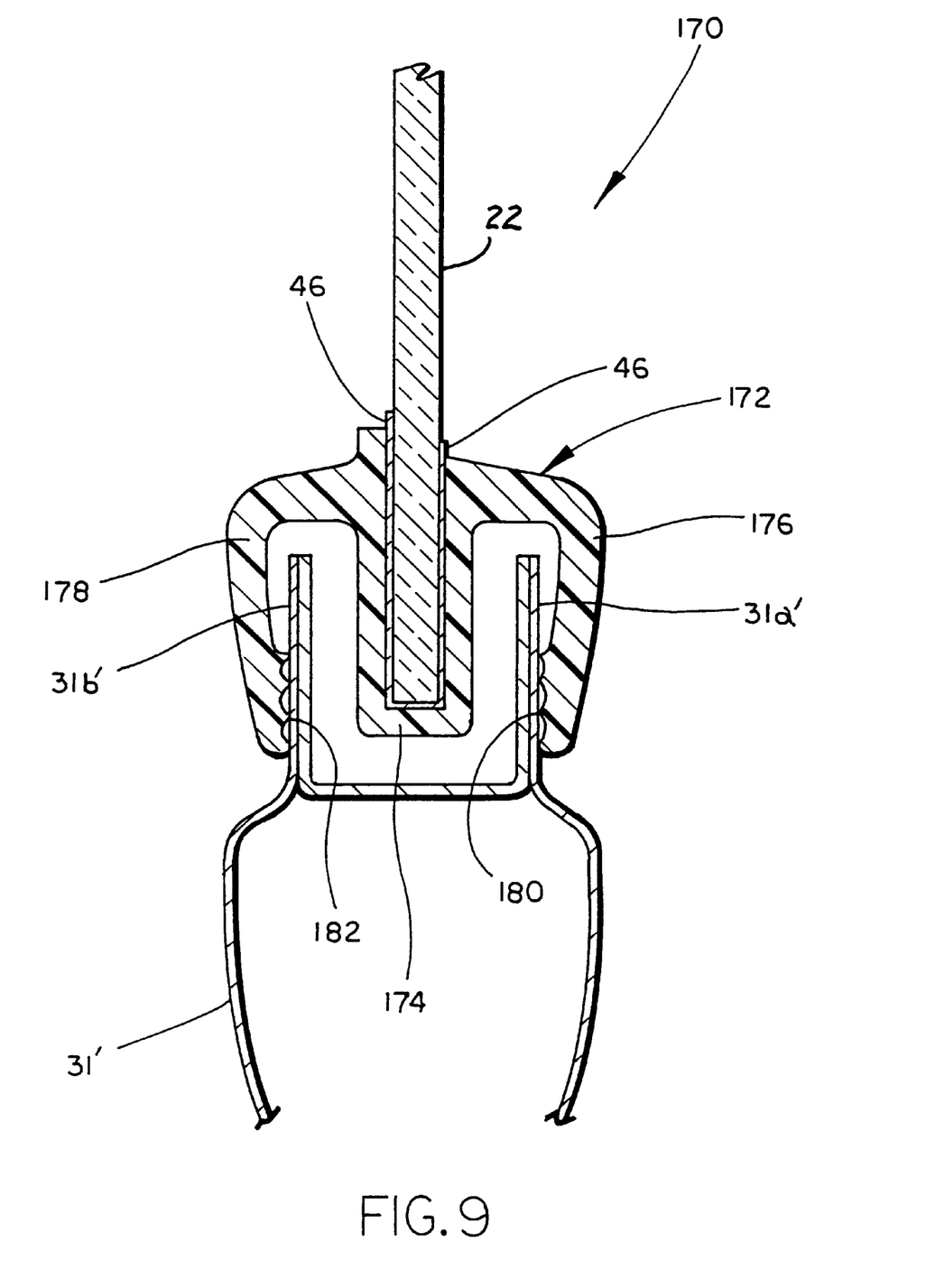
FIG. 9 is a fragmentary, sectional view of another embodiment of the window assembly of the present invention.

In FIG. 9, window assembly 170 includes glass panel 22 having a primer layer 46 extending around three sides of the peripheral edge of the window panel. A gasket 172 is molded over primer layer 46 from an olefinic-styrenic copolymer such as ethylene-styrene copolymer or ethylene-styrene interpolymer to extend around the three sides of the glass panel adjacent the periphery. In this case, because gasket 172 extends on either side of the window panel, inclusion of a frit layer is not necessary. Gasket 172 includes a U-shaped body portion 174 extending around and bonded to primer layer 46 on the periphery of the window on three sides, as well as opposing, L-shaped, elongated molded flanges 176, 178 on either side of the window assembly. The interior surface of each of the flanges 176, 178 includes a series of spaced, longitudinally extending ribs or protrusions 180, 182, respectively, adjacent its outer end. Ribs 180, 182 are adapted to grip against the outer surfaces of pinch weld flanges 31a', 31b' of pinch weld flange 31' to provide a weather seal. When the window assembly is engaged over the parallel, spaced pinch weld flanges 31a', 31b' of the vehicle body portion, which typically forms a portion of a sliding door assembly for a van, utility vehicle or the like, flanges 176, 178 are flexed outwardly such that ribs or protrusions 180, 182 grip tightly against the outer surfaces of the pinch weld flanges to form a weather seal preventing the entry of water, dirt, dust and the like.

Figure 10:
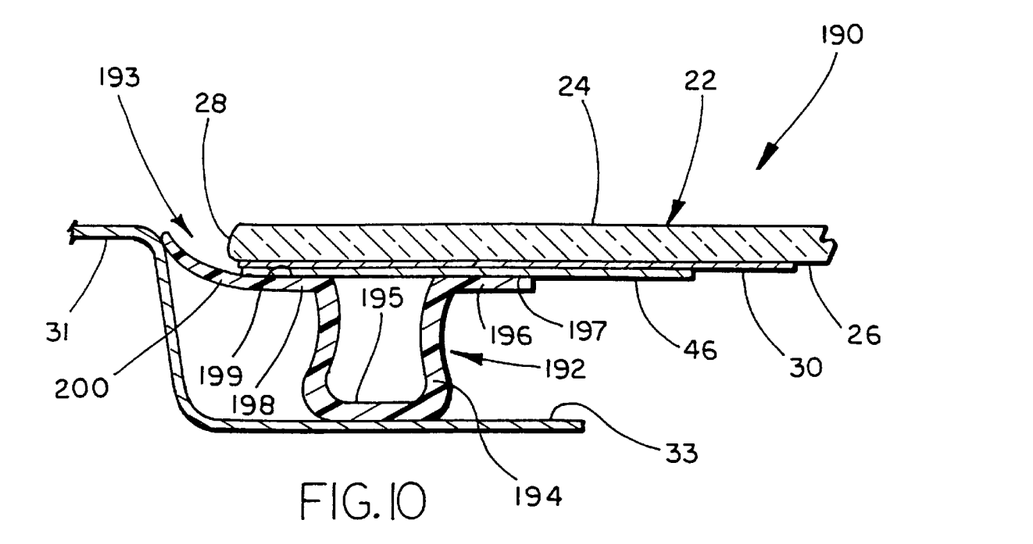
FIGS. 10 and 11 are fragmentary, sectional views of further alternate embodiments of the window assembly of the present invention.

A further alternative modular window assembly embodiment 190 incorporates a premolded gasket 192 having a premolded, bulb-type seal as shown in FIG. 10. In FIG. 10, flush-mounted panel assembly 190 includes a glass window panel 22 having an external surface 24, internal surface 26, and peripheral edge 28 as in prior embodiments. A frit layer 30 is applied over the peripheral edge portion of inner surface 26, followed by primer layer 46 of one of the types described above. Bonded to frit layer 30 on surface 26 using one of the above described bonding techniques is gasket 192 adapted to space sheet 22 from pinch weld flange portion 33. Gasket 192 also seals the gap 193 between the sheet metal 31 and peripheral edge 28. Gasket 192 includes an arciform body 194 defining a bulb-like, closed interior space 195 terminating in a securing flange 196 at one end and a second securing flange 198 at an opposite end. Securing flange 198 extends laterally away from arciform body 194 and beyond peripheral edge 28 of the sheet 22 to form a lip 200. Flanges 196, 198 include surfaces 197, 199 which are bonded to frit layer 30. When assembly 190 is disposed within the opening defined by pinch weld flange 31 such that arciform body 194 engages pinch flange 33, and when assembly 190 is properly centered therein, lip 200 at one end of securing flange 198 drags across sheet metal 31 and barricades gap 193 when properly located therein. With panel assembly 190 properly located within the vehicle opening defined by pinch weld flange 31, outer surface 24 of panel 22 is substantially flush with the surface defined by sheet metal 31. Panel assembly 190 provides a more aerodynamic fit and style producing less wind noise than conventional mounting techniques.

Preferably, gasket 192 is molded separately from panel 22 from a thermoplastic olefinic polymer material, preferably an olefinic-styrenic copolymer, namely, ethylene-styrene copolymer or ethylene-styrene interpolymer as described above. Following formation of the gasket 192, panel 22 is located thereon after having been coated with primer layer 46. The primer coated portion of the panel is pressed into intimate contact with gasket 192 for a prescribed period of time, possibly including heat applied to the contact boundary between the panel and gasket substantially simultaneously with the application of pressure, followed by removing the combined panel and attached gasket as an assembly. This method of manufacturing window assembly 190 is accomplished in accord with the method described in U.S. Pat. No. 5,443,673 to Fisher et al., assigned to the same assignee as the present invention, the disclosure of which is hereby incorporated by reference herein.

Figure 11:
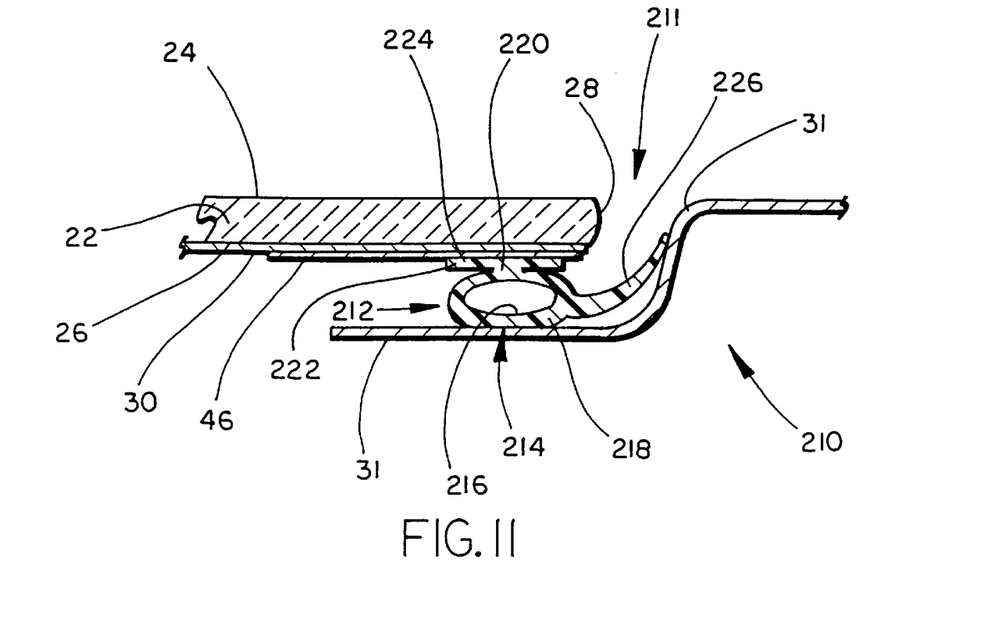

FIG. 11 illustrates an additional embodiment 210 of the modular window assembly made in accordance with the present invention. Assembly 210 includes a glass panel or sheet 22 having opposing outer and inner surfaces 24, 26 joined at peripheral edge 28 as in prior embodiments. Inner surface 26 includes frit layer 30 and primer layer 46 in accord with the techniques discussed above. Fixed to frit layer 30 and/or surface 26, and extending around at least a portion of sheet 22 near peripheral edge 28 is a flexible, resilient, extruded gasket 212 adapted to locate and seal panel 22 with sheet metal pinch weld flange 31 forming the window opening. Gasket 212 includes a tubular body 214 having a generally concentric inner chamber 216 formed by wall 218. Tubular body 214 is interconnected by an integral rib or web 220 to a securing flange 222 having a bonding surface 224 adapted to contact and bond with sheet 22 and/or frit layer 30. Also extending from tubular body 214 is a lip 226 adapted to engage the outer surface of sheet metal 31 and drape within the opening 211 between the sheet metal 31 and peripheral edge 28. Assembly 210 is a flush-mounted window assembly preferably having gasket 212 extruded from an olefinic-styrenic copolymer such as ethylene-styrene copolymer or ethylene-styrene interpolymer as described above.

Window assembly 210 is preferably manufactured by preforming gasket 212 by extrusion or the like and supporting the gasket in a fixture in a predetermined pattern to be bonded to the sheet-like window panel 22. Hence, gasket 212 is formed from the ethylene-styrene polymeric material separately from panel 22. Panel surface 26 which will receive gasket 212 is prepared by priming with primer layer 46 as described above followed by either preheating the panel and primer in the event it is transition temperature primer before receiving gasket 212, or followed by post heating of the contact area between gasket and primer layer 46 after receiving the gasket if primer layer is of the cross linking type. The supported gasket and primed window panel are then pressed together typically with the application of external heat. Preferably, heat is applied from the side opposite the primed surface as described below. The method of preforming and attaching gasket 212 to panel 22 is preferably in accord with that disclosed in U.S. Pat. No. 5,331,784 to Agrawal et al., assigned to the same assignee as the present invention, the disclosure of which is hereby incorporated by reference herein.

FIGS. 19 and 20 are schematic representations of two energy sources that may be used in conjunction with the modular window assemblies of FIGS. 1–11 described above to heat the panel 22 after ceramic frit layer 30 and primer coating 46 are applied, or for post heating after applying the gasket to the window panel. Although each source is described in relation to producing a particular energy spectrum, such is by way of example only. Other heat energy sources may be equally effective such as convective, conductive, inductive and resistive heat sources. Moreover, microwave energy may be used equally as well. In a preferred embodiment, energy sources shown in FIGS. 19 and 20 are located immediately adjacent a mold assembly. In this manner, panels 22 do not need to be transported very far before being loaded in the mold assembly. Thus, heat is retained and the high temperature necessary for molding with one of the primers 46 herein to produce the adhesion of this invention is maintained.

Figure 12:
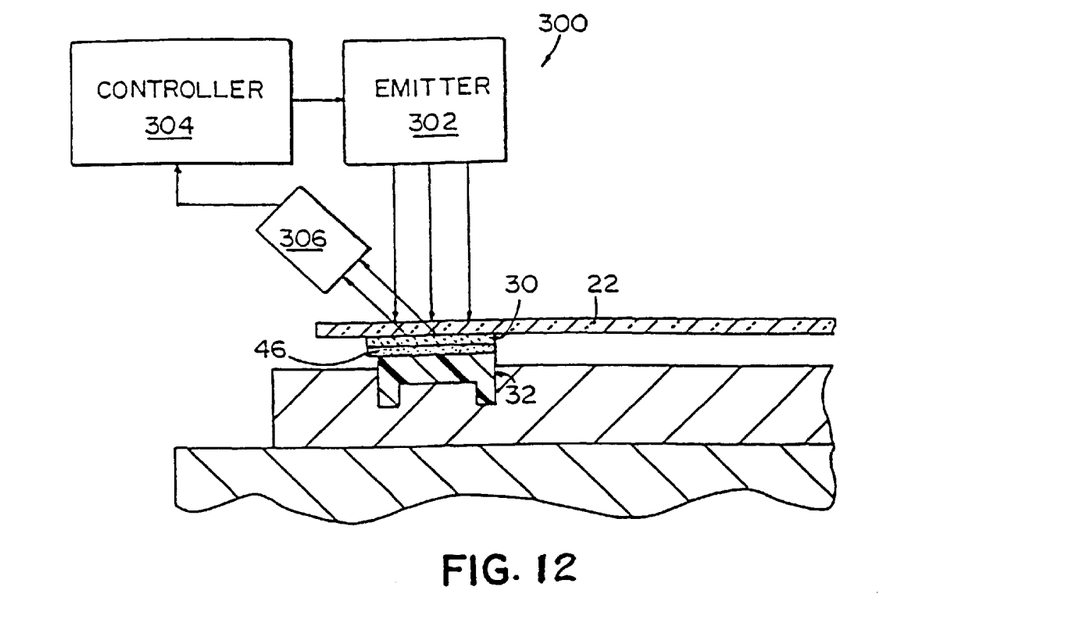
FIGS. 12 and 13 are schematic illustrations of two types of heating apparatus useful in manufacturing the window assemblies of the present invention.

FIG. 12 generally illustrates a controlled focused infrared (CFIR) source 300 which may be used either to cure the adhesive primer 46 after the gasket has been applied to panel 22, or to preheat panel 22 prior to molding of gasket 32 on panel 22, after the primer is applied over frit layer 30. Infrared source 300 includes one or more infrared emitter assemblies 302 such as Model 5305-104 made by Radiant Energy Research, Inc. of Minneapolis, Minn., and disposed above sheet 22 in a pattern conforming to that region of sheet 22 adapted to receive gasket 32, 101, 131, 151, 172, 192 or 212. In the alternative, a single infrared emitter assembly may be moved above sheet 22 by a guided robotic arm in a pattern conforming to that area to receive one of the gaskets. A computer/process controller 304 preferably causes infrared emitter assembly 302 to emit infrared energy into sheet 22 from a side opposite that containing frit coating 30 and adhesive primer coating 46, although it may be directed from the same side as the frit and the primer. A spectrophotometer 306 coupled to computer/process controller 304 detects the energy reflected and radiated from sheet 22. Based upon the feedback from spectrophotometer 306, controller 304 adjusts the power of infrared energy emitted by assembly 302 to obtain maximum absorption by frit layer 30 and primer coating 46. Absorption of infrared energy by frit layer 30 generates heat, preferably raising the temperature of frit layer 30 and primer coating 46 to more than about 93° C. (200° F.), and preferably, more than about 121° C. (250° F.). A preferred temperature is greater than or equal to about 93° C. (200° F.) and within the range of about 121° C. to 233° C. (250° F. to 450° F.) for the primers described above.

Figure 13:
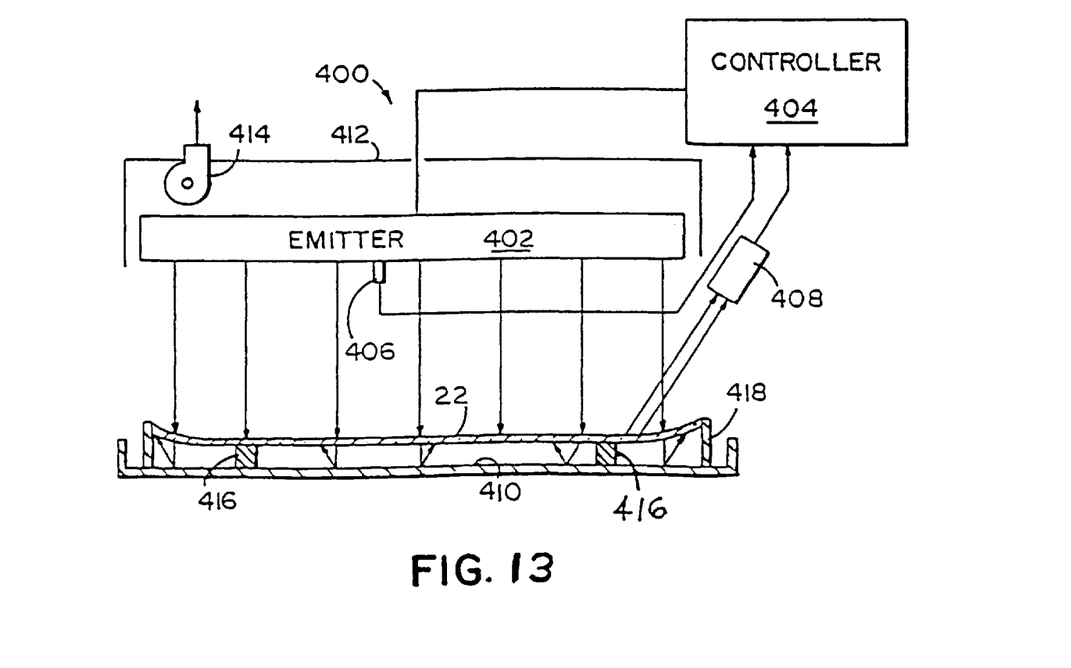

Alternately, the entire area of panel 22 can be heated. FIG. 13, which schematically illustrates a controlled area infrared (CAIR) source 400, may include one or more infrared emitters 402 such as Model FB122425B3 made by Casso-Solar Corp. of Pamona, N.Y., and may be distributed above and aligned with sheet 22. Radiation generated by emitter 402 is controlled by a controller 404 based upon input from a thermocouple 406 attached to emitter 402, and a spectrophotometer 408 angularly disposed with respect to sheet 22. A reflector 410 may be disposed beneath sheet 22 to reflect heat energy back into the sheet or panel. Panel 22 may be supported above reflector 410 by insulator blocks or spacers 416 to prevent heat loss by conduction into reflector 410. Contemplated in both of the heating options, but shown only in FIG. 13, is a plenum 412 and an exhaust fan 414, to vent fumes driven off during the heating process. Moreover, each sheet 22 may be properly located with respect to each heating source by using a template or guide for either the panel or sheet such as at 418.

Since the radiation produced by emitters 302 and 402 preferably is introduced into sheet 22 from a side opposite that containing primer coating 46, it is preferred that sheet 22 have a high transmissivity to the wavelength of radiation selected. Emitters 302 and 402 both are capable of producing infrared radiation having a wavelength greater than $7.0 \times 10^3$ Angstroms (Å). The transmissivity of the radiation through each sheet is greatly effected by its particular characteristics. For example, tinted or opaque panels may have a lower transmissivity since the pigments or coloration within the material may absorb a portion of the radiation. For materials having lower transmissivities, it is preferred to select wavelengths of radiation which promulgate better through these materials, yet are absorbed by the frit layer. In the preferred embodiment of this invention, panel 22 is a transparent glass sheet and may be a single sheet or laminated sheets, depending upon the desired function of the panel assembly.

In order to reduce problems associated with heating and cooling large expanses of glass or plastic panels, each of the above radiation sources may direct their energy to a restricted portion of the panel or sheet. For example, since it is desired to heat only that portion of the frit adapted to receive one of the gaskets, each energy source 302, 402, may be adapted so that the radiation is applied only to that area. Alternatively, each source may be moved around the sheet by a guided robotic arm, or a mask may be used to limit the exposed area.

The panel assemblies of FIGS. 1–9 described above are manufactured according to a method which results in superior adhesion of the gasket to a single surface of panel 22 on frit layer 30 and produces a bond substantially impervious to invasion by water. As described above and in U.S. Pat. Nos. 5,443,673 and 5,331,784, the embodiments of FIGS. 10 and 11 are manufactured in accord with alternate methods which also result in superior adhesion of the gasket to the frit layer or glass window panel.

Once panel 22 has been obtained with or without frit layer 30 applied to surface 26, the surface of panel 22 to receive the gasket is cleaned. The preferred cleaning technique is by wiping with a isopropyl alcohol which removes oils or other dirt and debris. The alcohol mobilizes any contaminants and evaporates in a short period of time leaving substantially no residue to interfere or degrade the process.

Following cleaning of panel 22, and after sufficient time has lapsed to evaporate any remaining solvent, primer adhesive 46 is applied to that portion which will be receiving molded gasket 32, and preferably to a slightly larger area. With respect to the embodiments having a gasket such as 32, it is preferred that application will be constrained to a linear path on frit layer 30 proximate peripheral edge 28 having a thickness within the range of 0.01 and 1.0 mils. For gaskets such as 172 shown in FIG. 9, application will be constrained to a linear path along both surfaces 24, 26 and peripheral edge 28 without frit layer 30, but of the same approximate thickness and also proximate peripheral edge 28.

Primer adhesive 46 of one of the types described above may be applied by a spray, wiper, roller extruder or other technique to the preferred thickness. Since it is anticipated that use of this invention will typically involve production of a large number of panels, an automated application technique is preferred. One automated process is by a robot applicator which extrudes a precise coat of primer adhesive 46 to a defined portion of panel 22. To accurately reproduce the robotic application of primer adhesive 46, conventional robotic devices require accurate positioning of panel 22 in reference to the robotic applicator.

Optionally, and prior to application of primer 46, a silane coupling agent such as Dow Coming's aminoalkyl functional silane Z-6020 may be wiped over the panel surface or frit layer 30. In the alternative and saving an extra step of wiping, the silane coupling agent may be premixed with primer adhesive 46. The ratio, by weight, or epoxy component to silane is greater than 1 and most preferably approximately 1.7. The presence of the silane coupling agent improves the adhesive character of the primer.

In the event primer 46 is a transition temperature primer as described above, and subsequent to the application of primer adhesive 46 and any silane coupling agent, it is preferred that a CAIR heater 400 be used to heat panel 22, frit layer 30 and primer adhesive 46 to a temperature greater than about 93° C. (200° F.) and, most preferably, to a temperature between about 121° C. and 177° C. (250° F. and 350° F.), usually about 163° C. (325° F.). Sufficient heat is retained in panel 22, primer 46 and frit layer 30 so that the temperature will be above about 93° C. (200° F.) after transfer of panel 22 from CAIR source 400 to a mold assembly and during the molding process. Using CAIR source 400, it is contemplated that the dwell time to achieve a temperature of panel 22 within that range to take as long as 20 seconds.

Immediately following heating of panel 22, frit layer 30 and adhesive primer 46 to a temperature greater than equal to the primer transition temperature, panel 22 is transported from CAIR 400 and loaded into a suitable injection molding assembly, and the mold is closed. One option available in the method before loading panel 22 is to load the locating or mounting hardware such as fasteners 84, 110 or 160 in the mold cavity of the mold assembly so that it will be positioned and/or are least partially encapsulated by the molded gasket.

As briefly mentioned above, it is contemplated that this invention will be implemented using automated machinery. Accordingly, a robotic arm will preferably remove panel 22 from CAIR 400, and according to a program, locate the panel in the mold assembly. With panel 22 loaded in the closed mold assembly, panel 22 is ready to receive the molded gasket. Subsequent to the filling of the mold cavity with the injected ES or ESI polymers, and following partial curing of the gasket, the mold assembly is opened. Once the panel assembly is fully removed from the mold, and the gasket fully sets up and cures throughout, the bond between it and panel 22 is extremely strong.

In the event a cross-linkable primer 46 is used, and once the panel assembly has been formed in the mold assembly, an additional step may be followed to assure that the primer properly bonds the gasket to the window panel. In this additional step, the window assembly is removed from the mold assembly and placed in a separate fixture containing one or the other of heating sources 300, 400 described above. The window assembly is located and heating source is activated so as to introduce radiation into panel 22 from a side opposite that receiving the gasket. The infrared energy is absorbed at the contact boundary between the gasket and the panel resulting in an increase in temperature. If a frit layer is present, the frit is heated. Preferably, the temperature of the frit or boundary is raised to a sufficient temperature to mobilize and cross link the primer and further react with the gasket. However, it is preferred that the temperature is not so high so as to melt the gasket. Following such post heating, the panel assembly is allowed to cool and be moved on in the assembly process.

It will be understood that many other gasket shapes and configurations may be used in the present invention. For example, the gasket sections and varieties disclosed in the following United States patents and patent applications, all assigned to the same assignee as the present invention, may all be used. The disclosures of these patents are hereby incorporated by reference herein: U.S. Pats. No. 5,635,281; 5,544,458; 5,475,956; 5,443,673; 5,331,784; 5,261,721; and 6,00,814. Similarly, the moldable gasket materials disclosed in the above patents and applications may also be blended with the thermoplastic olefinic-styrenic copolymers such as ethylene-styrene copolymer [interpolymer] in the present invention.

Preferably, the vehicle window assemblies of the present invention are manufactured for "ready to install" installation. As such, the assemblies include an activatable adhesive applied to the glass periphery or gasket. The adhesive is activated with heat or other methods at the assembly location, thereby eliminating the need to apply primers, adhesives, or other materials at the assembly plant. The adhesive on the fully prepared assemblies can thus be activated immediately prior to installation.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

The embodiments of the invention in which an exclusive property or privilege is claimed are as follows:

1. A vehicle window assembly for closing a window opening in a vehicle, comprising:
   a panel in the form of a sheet having first and second surfaces terminating in a peripheral edge;
   a primer layer applied to a predetermined area of said first surface; and
   at least one polymeric gasket applied to said sheet-like panel on at least a portion of said first surface having said primer layer, said gasket including an olefinic-styrenic copolymer and bonded to said portion of said sheet-like panel, said olefinic-styrenic copolymer comprising a styrene content in the range from about one (1) molar percent to about fifty (50) molar percent.

2. The window assembly of claim 1 wherein said polymeric gasket comprises ethylene-styrene copolymer.

3. The window assembly of claim 2 wherein said ethylene-styrene copolymer has a styrene content of at least about one molar percent.

4. The window assembly of claim 3 wherein said ethylene-styrene copolymer has a styrene content of at least about 5 molar percent.

5. The window assembly of claim 4 wherein said ethylene-styrene copolymer has a styrene content within the range of between about 5 and 35 molar percent.

6. The window assembly of claim 3 wherein said ethylene-styrene copolymer comprises melt-processible resin material produced using metallocene catalysis.

7. The window assembly of claim 1 wherein said assembly further includes a silane coupling agent applied to said sheet-like panel, said primer layer being applied over said silane coupling agent.

8. The window assembly of claim 1 wherein said polymeric gasket includes:

a molded body having a first portion in intimate contact with said primer layer; and at least one flange extending from said body for spacing said panel from a mounting surface.

9. The window assembly of claim 1 wherein said primer forming said layer has a transition temperature greater than about 93° C. (200° F.), and said gasket is molded on said primer layer when said primer layer is at a temperature equal to or greater than 93° C. (200° F.).

10. The window assembly of claim 1 including an opaque ceramic coating bonded to said first surface of said panel and receiving said primer layer.

11. The window assembly of claim 1 wherein said primer layer is a cross-linkable material, said primer being cured after application of said gasket by the application of heat to bond the gasket to the window panel.

12. The window assembly of claim 1 including a mechanical fastener at least partially encapsulated within said polymeric gasket and projecting out of said polymeric gasket, said fastener adapted to mechanically assist in retaining said panel assembly in the window opening.

13. The window assembly of claim 1 including an adhesive deposited on at least one of said polymeric gasket and said panel for adhering said window assembly in the window opening.

14. The window assembly of claim 1 including:

a second polymeric gasket molded about and encapsulating at least a portion of said peripheral edge of said sheet-like panel, said second gasket having at least a first securing flange extending from said peripheral edge inwardly toward a center of said sheet-like panel and a lip portion which extends away from said peripheral edge.

15. The window assembly of claim 1 wherein said primer forming said layer has a transition temperature; said polymeric gasket being applied to said primer layer on said panel while said primer layer is at a temperature greater than said transition temperature whereby adhesion of said gasket to said panel is improved.

16. The window assembly of claim 7 wherein said primer layer comprises a thermoplastic olefinic polymer.

17. The window assembly of claim 16 wherein said primer layer comprises one of a copolymer, homopolymer, functionalized copolymer and functionalized homopolymer.

18. The window assembly of claim 16 wherein said primer layer comprises one of an ethylene-styrene interpolymer, ethylene-vinyl acetate copolymer, ethylene-acrylic acid copolymer, ethylene-vinyl silane copolymer, ethylene vinyl alcohol copolymer, ethylene-acrylate copolymer, ethylene-vinyl silane-vinyl acetate terpolymer, ethylene-acrylate-acrylic acid copolymer, ethylene-acrylate-glycidyl methacrylate copolymer, silane grafted polyolefin, maleic anhydride grafted polyolefin, oxidized polyolefin, chlorinated polyolefin, and a polyolefin with any functional group such as carboxylic acid, silane, hydroxy, anhydride, epoxy and halogen.

19. The window assembly of claim 16 wherein said primer layer comprises an ethylene-styrene copolymer.

20. The window assembly of claim 1 wherein said primer layer is a cross-linkable primer.

21. The window assembly of claim 20 wherein said primer layer is one of a functionalized polyolefin, thermoplastic elastomer, ethylene-styrene copolymer, urethane, acrylic, or epoxy.

22. The window assembly of claim 20 wherein said primer layer is cured by at least one of heat curing, ambient curing with cross-linkers, ambient moisture, or combinations thereof.

23. The window assembly of claim 2 wherein said ethylene-styrene copolymer comprises substituted ethylene or styrene moeities.

24. The window assembly of claim 23 wherein said substituted moeities comprise functional groups including polar groups such as hydroxyls, carboxyls, amino groups, acrylate/acrylic groups, functionalized alkyl groups, epoxy groups, vinyl groups, and allyl groups.

25. The window assembly of claim 2 wherein said ethylene-styrene copolymer has a melting temperature of at least about 60° C.

26. The window assembly of claim 2 wherein said ethylene-styrene copolymer has a flexural modulus of less than or equal to about 200 megapascals at a temperature of about 0° C.

27. The window assembly of claim 2 wherein said ethylene-styrene copolymer has a flexural modulus of less than or equal to about 100 megapascals at a temperature of about 0° C.

28. The window assembly of claim 2 wherein said ethylene-styrene copolymer has a flexural modulus of less than or equal to about 50 megapascals at a temperature of about 0° C.

29. The window assembly of claim 1 wherein said polymeric gasket includes a sealing lip extending therealong for engagement with a vehicle body to form a weather seal therebetween.

30. The window assembly of claim 29 wherein said sealing lip extends inwardly toward the vehicle body from a portion of said gasket on said first surface.

31. The window assembly of claim 29 wherein said sealing lip extends outwardly from said assembly adjacent said peripheral edge of said panel.

32. The window assembly of claim 31 wherein said gasket includes an edge portion affixed to said peripheral edge, said lip extending from said edge portion.

* * * * *

UNITED STATES PATENT AND TRADEMARK OFFICE
CERTIFICATE OF CORRECTION

PATENT NO. : 6,089,646
DATED : July 18, 2000
INVENTOR(S) : Qihua Xu and David E. Nestell

It is certified that error appears in the above-identified patent and that said Letters Patent is hereby corrected as shown below:

Column 1, line 11:
   "Modem" should be --Modern--
Column 7, line 40:
   After "ethylene-" insert --α--
Column 15, line 30:
   "Coming's" should be --Corning's--
Column 16, line 35:
   "6,00,814" should be --6,000,814--

Signed and Sealed this

First Day of May, 2001

Attest:

NICHOLAS P. GODICI

Attesting Officer     Acting Director of the United States Patent and Trademark Office